O. ZWIETUSCH.

Faucets.

No. 5,086. Reissued Oct. 1, 1872.

*Witnesses*

J. B. Smith

F. E. Smith

*Inventor*

Otto Zwietusch

UNITED STATES PATENT OFFICE.

OTTO ZWIETUSCH, OF MILWAUKEE, WISCONSIN.

IMPROVEMENT IN FAUCETS.

Specification forming part of Letters Patent No. 129,263, dated July 16, 1872; reissue No. 5,086, dated October 1, 1872.

*To all whom it may concern:*

Be it known that I, OTTO ZWIETUSCH, of Milwaukee, in the county of Milwaukee and State of Wisconsin, have invented certain Improvements in Faucets; and I hereby declare the following to be a full, clear, and exact description thereof, reference being had to the accompanying drawing making a part of this specification, in which—

Figure 1:
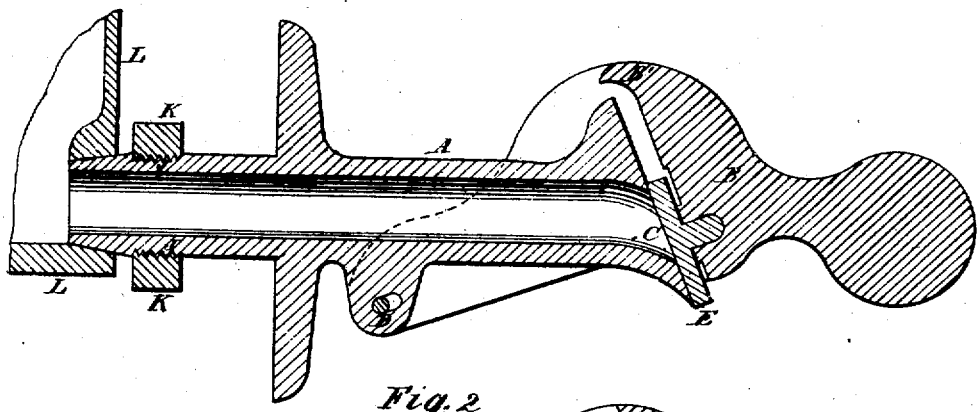
Figure 2:
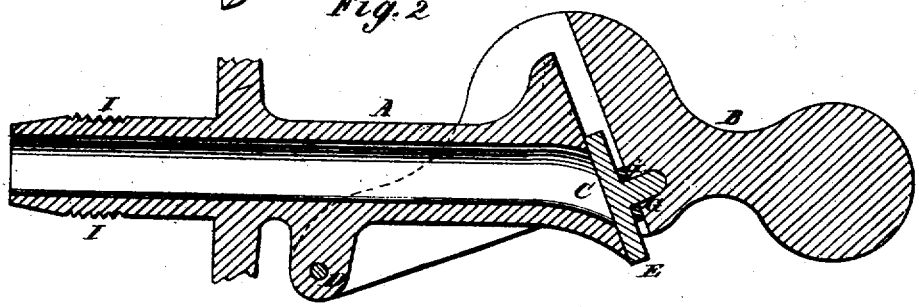

Figures 1 and 2 show sectional views of my improved faucet.

My invention has for its purpose to provide a glass faucet, simple and cheap in construction, which can be utilized, especially as a faucet for sirups in soda-fountains, and is anti-corrosive, and consequently of great utility for chemical purposes; and it consists in closing the mouth of a glass tube by a valve in a head piece of a lever pivoted on the tube, said valve being so constructed that it admits of a rubber packing or a spring between the valve and the head, and a rocking motion is allowed.

In order that those skilled in the art may make and use my invention, I will now proceed to describe the manner in which I have carried it out.

In the said drawing, A is the body of the glass faucet. A projection, D, on the body A allows the pivoting of the levers of the head B, and the head works up and down over the orifice C. The head, at or near its lower part, has a socket in it, which carries a valve, as shown, and between the valve and the head is a flexible or elastic packing, G. This flexible packing, together with the loose joint between the head and the valve, allows the valve to have considerable play, and the valve accommodates itself to the face of the orifice C, and effectually closes it. As the valve passes over the orifice it cuts off the supply of the liquid and prevents any wastage from dripping.

The face of the orifice can be made either slanting or at right angles to the longitudinal line of the faucet, and the play of the valve allows it to accommodate itself to the arc of the circle described by the head in passing around the pivot D. The slanting face of the faucet should be made nearly in an arc on the circle described in the travel of the valve, the diameter being slightly increased toward the lower point of the orifice.

Having thus described my invention, what I claim as new, and desire to secure by Letters Patent, is—

1. The valve E, with its flexible packing or spring and loose joint, in combination with the body A of the faucet, substantially as described.

2. A faucet, constructed as described, with the drop B, cap B′, and yielding plate or valve E sliding against the orifice c, substantially as described.

OTTO ZWIETUSCH.

Witnesses:

JOHN G. HIRSCH,

GUSTAVUS EHLUT.